H. G. COOK.
COAL WASHER.
APPLICATION FILED APR. 18, 1914.
1,162,753.
Patented Dec. 7, 1915.
Fig. I.
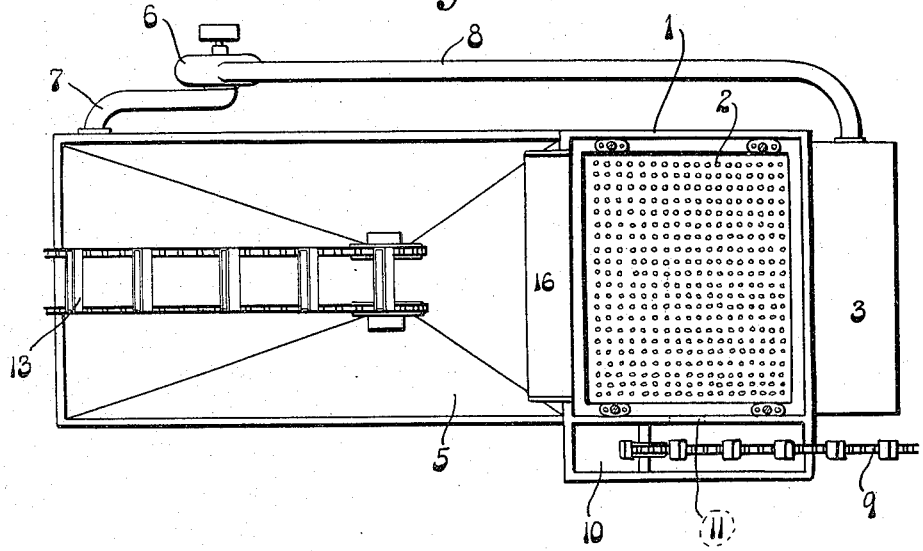
Fig. II.
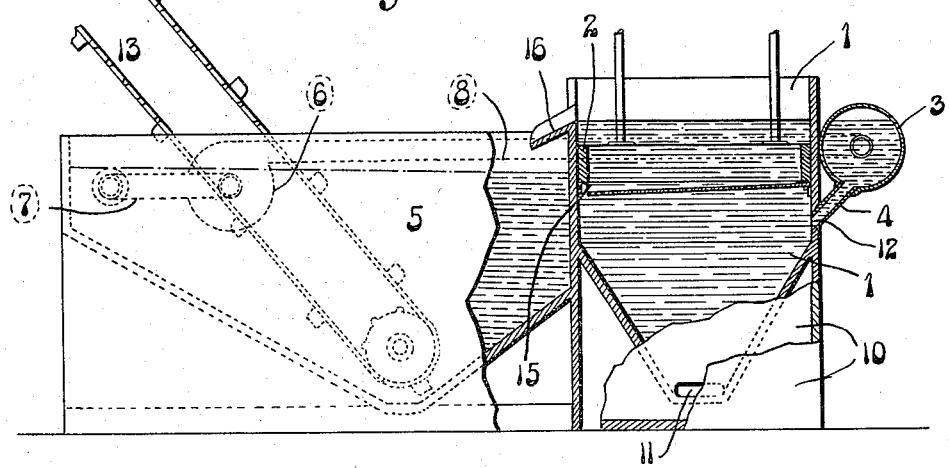
Attest
A. J. McCauley
E. K. Clark.
Inventor:
H. G. Cook
by Knight & Cook
Attys.

UNITED STATES PATENT OFFICE.

HOWARD G. COOK, OF ST. LOUIS, MISSOURI, ASSIGNOR TO WILLIAM M. DUNCAN, OF ALTON, ILLINOIS.

COAL-WASHER.

1,162,753.  Specification of Letters Patent.  Patented Dec. 7, 1915.

Application filed April 13, 1914. Serial No. 832,714.

*To all whom it may concern:*

Be it known that I, HOWARD G. COOK, a citizen of the United States of America, and a resident of the city of St. Louis and State of Missouri, have invented certain new and useful Improvements in Coal-Washers, of which the following is a full, clear, and exact description, reference being had to the accompanying drawings, forming a part of this specification.

My invention relates to coal washers and has for its object the production of a very efficient apparatus for separating coal from impurities, such as slate, bone coal, etc., the apparatus being so constructed that a very large volume of water for washing purposes may be admitted to a jig tank in which a reciprocating jig is suspended.

Briefly stated, my invention preferably comprises a combination of elements including a jig provided with a perforated bottom upon which the raw coal is dumped, a jig tank in which the jig reciprocates, an overflow tank into which washed coal and water are discharged from the jig, and means for returning water from the overflow tank to the jig tank. The water to be returned to the jig tank is preferably delivered to a water reservoir communicating with an inlet opening formed in the jig tank at a point below the jig. The water reservoir is preferably closed at the top so that air may be compressed between the surface of the water and the top of the reservoir, and to insure a very rapid flow of water to the jig tank, the latter is in unobstructed communication with the water reservoir.

Prior to my invention coal washers have been provided with flap valves or check valves covering the inlet openings in the jig tanks and such valves necessarily retard the incoming water thereby reducing the efficiency of the washer. When the jig moves downwardly in the jig tank it tends to force the water through the inlet opening in the jig tank, and to prevent the escape of water at this point the inlet opening has been covered with a check valve which interferes with the incoming water during the upstroke of the jig. The movement of the jig is usually only about four inches and it occurs in a very brief period of time, so that any obstruction such as a check valve at the inlet opening will impair the efficiency of the washer by obstructing the flow of water to the jig tank. By my improvement I dispense with the check valve and to prevent the escape of an excessive quantity of water through the inlet opening, I preferably locate the water reservoir above said inlet opening so that the water contained in the reservoir resists an upward or return movement of the water at the inlet opening. The resistance offered by the water in the reservoir corresponds in some respects to the resistance offered by the check valves in the old coal washers. The water reservoir may be closed at the top to provide a closed air space above the water, and in this event an upward or return movement of the water at the inlet opening, will be resisted by the air in the closed reservoir as well as by the weight of the water contained therein. If any water escapes from the jig tank by returning through the inlet opening it will compress the air in the reservoir and when the jig moves away from the inlet opening, this air under pressure will serve as a pressure medium for accelerating the flow of incoming water at the inlet opening.

Figure I is a diagrammatical top or plan view of a coal washer embodying the features of my invention. Fig. II is a side elevation, partly in section.

In the accompanying drawings: 1 designates the jig tank, 2 the jig, and 3 the water reservoir connected to the jig tank by a conduit 4.

5 designates the overflow tank which receives the washed coal and water from the jig tank 1.

6 designates a centrifugal pump connected to a return pipe 7 leading to the overflow tank.

8 designates the return pipe leading from the pump to the water reservoir 3.

9 designates a bucket elevator mounted in a tank 10 adjoining the jig tank and communicating therewith through an opening 11 near the bottom of said tank.

The refuse entering the jig tank from the jig 2 falls onto the inclined bottom of the jig tank which directs said refuse to the opening 11. The raw coal is dumped onto the perforated bottom of the jig 2 and the jig is reciprocated by any suitable mechanism. When the jig descends in the jig tank, water is forced through the perforated bottom of the jig and through the material lying thereon. As the specific gravity of the coal is but little in excess of the water, the coal tends to rise nearly to the surface of the water in response to a downward movement of the jig, while the impurities being heavier gravitate to the bottom of the jig and finally pass from the jig through the opening 15 at the left hand side of the lower portion of the jig. When the jig moves upwardly the upper stratum of water and washed coal above the jig is discharged onto a chute 16 leading to the overflow tank 5. The capacity of this overflow tank is sufficient to allow the water therein to be comparatively quiet thus permitting the settling of the coal therein. The washed coal may be removed from the overflow tank by a bucket elevator 13. The water is returned from the overflow tank to the jig tank by means of the centrifugal pump 6, return pipes 7 and 8, water reservoir 3 and conduit 4 leading from the water reservoir to an inlet opening 12 in the jig tank.

It will be noted that the reciprocating jig 2 operates in a manner similar to the operation of a large pump plunger, the heavy impurities lying upon the perforated bottom of the jig serving to open and close the perforations in response to vertical movements of the jig. When the jig moves upwardly the heavy impurities almost entirely close the perforations in the jig and the upper stratum of coal and water above the jig is therefore positively discharged into the overflow tank 5, and at this time the jig tends to draw a fresh supply of water through the inlet opening 12. When the jig moves downwardly the water in the jig tank rushes through the perforated bottom of the jig thereby lifting the heavy impurities resting upon the jig bottom and during this downward movement the jig tends to force water through the inlet opening 12 in the jig tank. As previously pointed out, check valves have been arranged at the inlet openings of jig tanks to prevent the water from rushing back through such inlet openings when the jig moves downwardly. In accordance with my invention no obstructions are present at the inlet opening and to prevent the escape of an excessive quantity of water at this point I preferably locate the water reservoir 3 above the inlet opening so that the weight of the body of water in the reservoir tends to resist the upward movement of the water at the inlet opening. To further resist a return movement of the water, the water reservoir is preferably closed at the top to serve as means for confining air above the water contained therein. If any water escapes at the inlet opening 12 it will lift the water in the water reservoir and compress the air in the upper portion of said reservoir. When the jig moves upwardly a very large volume of water rushes quickly through the inlet opening 12, no obstructions being present at this point, and the water being placed under pressure by the centrifugal pump 6. If any air is compressed in the upper portion of the water reservoir it will serve to increase the rate of flow at the unobstructed inlet opening 12.

I claim:

In a coal washer, a jig tank, a jig arranged in said jig tank and adapted to reciprocate vertically therein, a water reservoir in unobstructed communication with said jig tank beneath said jig, a coal and water receiving tank adjoining said jig tank adapted to receive the coal and water overflowing from said jig tank in response to a reciprocating movement of the said jig, and means for pumping a supply of water from said coal and water receiving tank to the water reservoir, said water reservoir being closed at the top to serve as means for holding air under pressure above the water contained therein, and said water reservoir being adapted to deliver water to the jig tank under the pressure imposed in said reservoir.

HOWARD G. COOK.

In the presence of—
M. M. APGAR,
A. J. McCAULEY.

Copies of this patent may be obtained for five cents each, by addressing the "Commissioner of Patents, Washington, D. C."